Jan. 26, 1943.  H. C. BORISCH  2,309,438
SEAT CUSHION
Filed Oct. 18, 1940  2 Sheets-Sheet 1
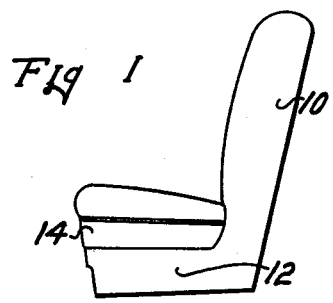
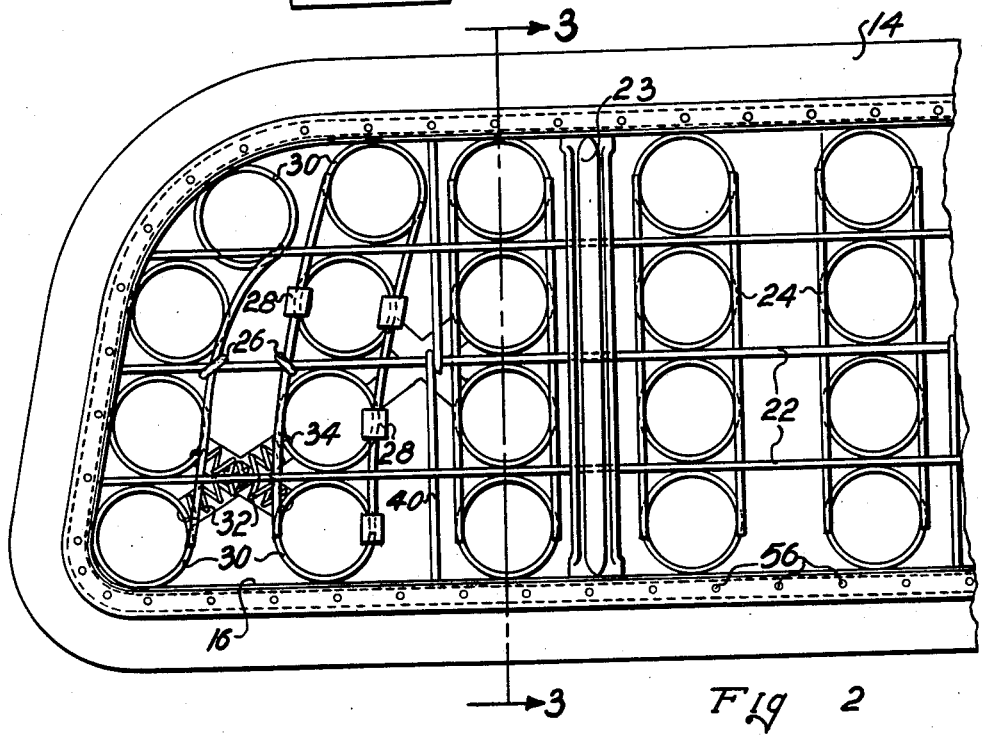
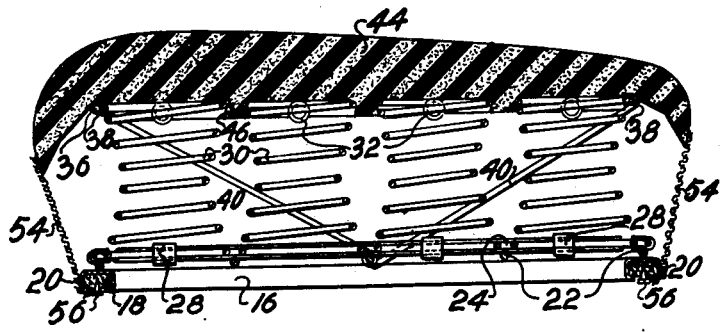
INVENTOR.
HENRY C. BORISCH
BY Carl J. Barbee
his ATTORNEY.

Jan. 26, 1943.  H. C. BORISCH  2,309,438
SEAT CUSHION
Filed Oct. 18, 1940  2 Sheets-Sheet 2
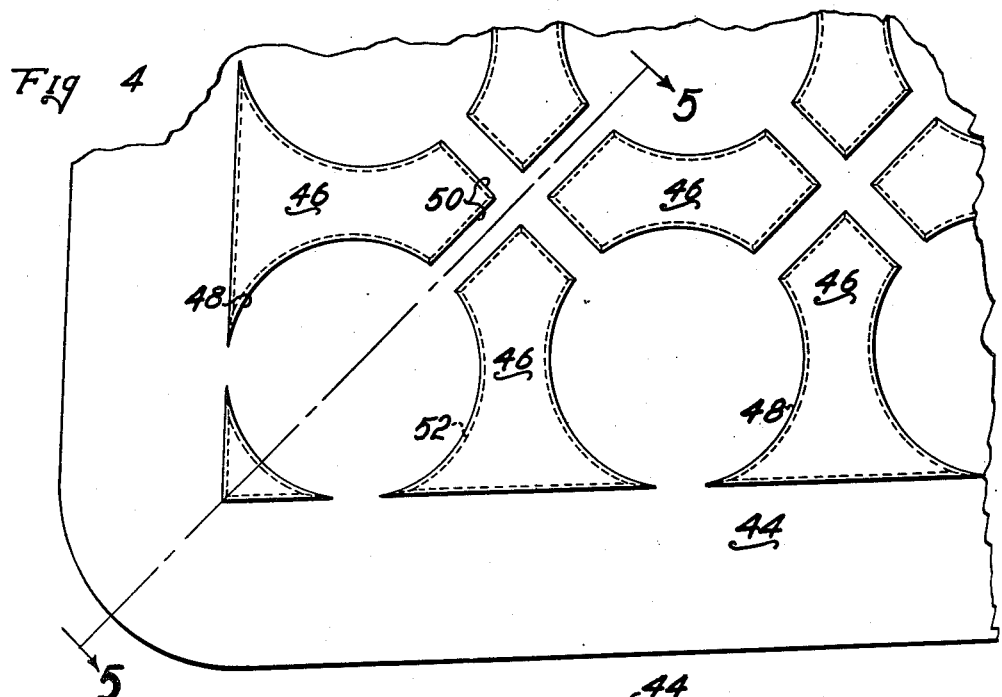
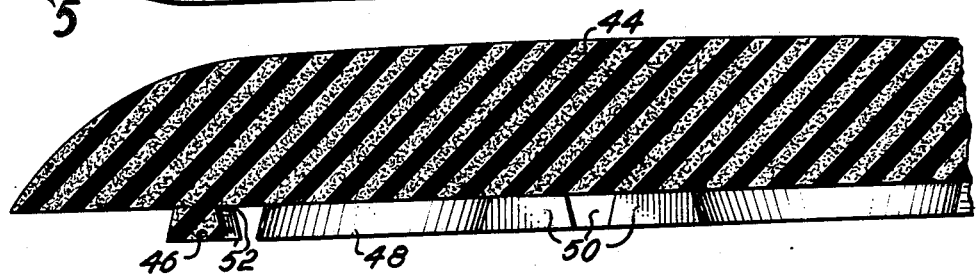
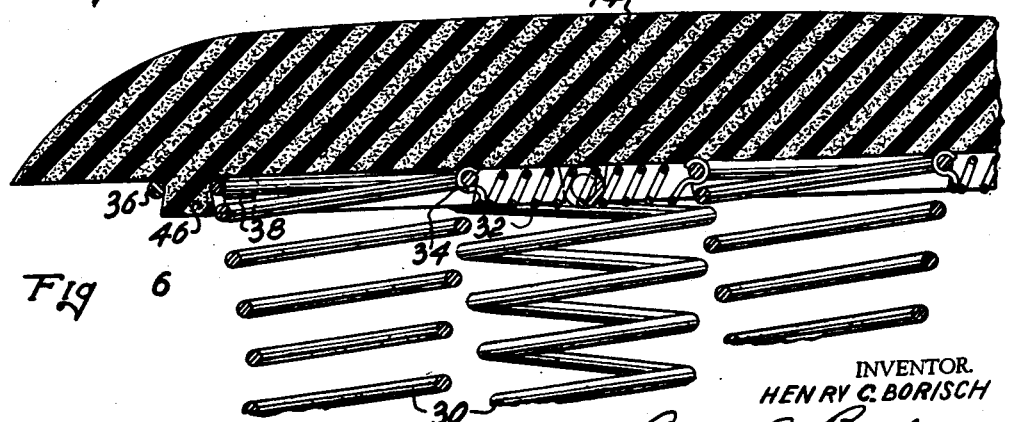
INVENTOR.
HENRY C. BORISCH
BY
ATTORNEY.

Patented Jan. 26, 1943

2,309,438

UNITED STATES PATENT OFFICE 2,309,438

SEAT CUSHION

Henry C. Borisch, Milwaukee, Wis., assignor to Nash-Kelvinator Corporation, Kenosha, Wis., a corporation of Maryland Application October 18, 1940, Serial No. 361,679

11 Claims. (Cl. 155—179)

This invention relates to seat cushions and has particular reference to cushions for automobile bodies.

It is an object of this invention to provide a seat cushion which is cheaper than cushions used heretofore.

It is another object of this invention to provide a seat cushion using sponge rubber or some similar material in place of the usual padding.

It is another object of this invention to provide a sponge rubber seat cushion which uses a minimum of sponge rubber.

It is another object of this invention to provide novel means for mounting a sponge rubber pad on a coil spring assembly.

Other objects and advantages of this invention will be apparent from a consideration of the following description and claims and the attached drawings of which there are two sheets and in which—

Figure 1 represents an end elevation of an automobile seat;

Figure 2 represents a bottom plan view of the cushion shown in Figure 1;

Figure 3 represents a sectional view taken along a plane indicated by the line 3—3 in Figure 2 and looking in the direction of the arrows;

Figure 4 represents a bottom plan view of the seat pad shown in Figure 3;

Figure 5 represents a sectional view taken along a plane indicated by the line 5—5 in Figure 4;

Figure 6 represents a view similar to Figure 5 but with the supporting springs in position.

Seat cushions have recently been developed which employ padding of sponge rubber or rubber which has been blown full of air pockets in place of the older type of cloth and hair padding. One form of this sponge rubber is known commercially as "air foam" rubber. The term "sponge rubber" in this description and in the claims should be taken to mean any material which is resilient and soft like this rubber. This sponge rubber has the advantage of being both soft and resilient and not liable to become permanently matted and lumpy. It is, however, relatively expensive. This invention deals with means for reducing to a minimum the amount of sponge rubber needed in the seat. While the structure disclosed in this application is for the seat cushion of an automobile seat as distinguished from the back cushion of the seat, it will be understood that the invention may be employed equally well in the back cushion and may be also applied to seats other than automobile seats.

Figure 1 shows an automobile seat consisting of a back 10 which is joined with, and supported by, a base 12. Supported on the base 12 is a cushion 14. The base 12 may be of any desired construction arranged to be mounted in an automobile in the usual manner.

More specifically, the cushion 14 consists of a frame 16 which is generally channel-shaped in cross section and conforms in outline to the shape of the cushion, being slightly smaller than the outline of the cushion. Flanges 18 are turned inwardly from the edges of the frame 16 and serve to retain a nailing strip 20 within the channel-shaped cross section of the frame. The nailing strip 20 consists of wood or tightly rolled "kraft" paper. Secured on top of the frame 15 and extending transversely thereacross, is a series of transverse support bars 22. The forward and back support bars 22 are positioned on top of the forward and back side of the frame 16, while the intermediate bars 22 span the space between the sides of the frame. The transverse bars 22 are supported at several points between their ends by the longitudinal braces 23 which are secured to the front and back of the frame 16. Positioned on top of the support bars 16 is a series of longitudinal support bars 24 which are secured to the transverse support bars 22 by some suitable means such as clips 26 (see Figure 2) or by welding the two bars together. Attached to the longitudinal bars 24 as by means of suitable clips 28 is a series of coil springs 30 which are arranged in longitudinal and transverse rows. The tops of the coil springs 30 are tied together by tie springs 32 which have their ends looped around the upper turn of the coil springs 30 as is indicated at 34. The tie springs 32 are shown to be connected between diagonally positioned coils 30. However, other arrangements of the tie springs may be used. Attention is called to the fact that some of the tie springs and clips have been omitted in the drawings for purposes of clarity. An upper border wire 36 extends around the entire group of coil springs 30 and is secured to the outer springs by means of clips 38. The border wire 36 serves to retain the tops of the coil springs 30 in a compact group.

Diagonal tie wires 40 are wound around the center transverse support bar 22 and have their ends secured to the upper border wire at the front and back of the seat. The diagonal wires 40 prevent the front and rear coil springs from tipping and cause the entire spring assembly to deflect in a generally vertical direction.

Positioned on top of the spring assembly is a pad 44 of sponge rubber or some similar material. The under side of the pad 44 is provided with a series of projections 46 which form circular pockets 48 joined by the cross troughs 50. The projections 46 are undercut as at 52 so that the pockets 48 and troughs 50 taper to a smaller size at the bottom surface of the projections 46. The projections 46 may be formed by fastening separate pieces to the cushion 44, but are preferably formed by molding along with the pad 44. The projections are so arranged that the tops of the coil springs 30 will project into the pockets 48 while the tie springs 32 are positioned in the troughs 50. The border wire 36 extends around the outside of the projections 46 while the clips 38 are positioned in openings left in the projections 46 where the coil springs 30 join with the border wire 36. The tapered shape of the pockets 48 and troughs 50 retain the upper ends of the coil springs 30 and tie springs 32 within the troughs and pockets and prevent the pad 44 from shifting relative to the spring assembly. The projections 46 being of soft rubber construction will, of course, deform sufficiently to allow the spring assembly to be easily pressed into the pockets 48 and trough 50.

The pad 44 is further secured to the spring assembly base 16 by means of a cloth tie strip 54 which is cemented to the edges of the cushion 44 and drawn down over the bottom of the frame 16 where it is secured by tacks 56 driven into the nailing strip 20. Suitable upholstery material may be laid over the pad 44 and also tacked to the nailing strip 20.

It is thus evident that the cushion is partially retained in shape by the pad 44, thus reducing the amount of wire required to hold the spring assembly in shape, while at the same time the pad 44 eliminates the necessity of sewing or binding, as is necessary with other types of padding material, to keep the padding in shape. The projections 46 are of small volume so that little more of the sponge rubber is necessary than the amount needed to properly pad the top of the coil springs. The cushion is soft and yielding to vertical loads, but not easily shifted in horizontal directions.

While I have described my invention in some detail, I intend this description to be an example only and not as a limitation of my invention to which I make the following claims.

1. In a cushion, a frame, a series of coil springs supported with their axes normal to the plane of said frame, a tie wire surrounding said series of springs at the upper ends thereof and connected to the outer coils of said series, a pad of sponge rubber positioned over the ends of said springs, projections formed on said pad within said tie wire and defining pockets within which the ends of said springs are received, said projections being cut away where said springs and tie wire are connected, and a tie strip secured to the edges of said pad and to said frame for retaining said pad on said springs.

2. In a cushion, a frame, a series of coil springs supported with their axes normal to the plane of said frame, a tie wire surrounding said series of springs at the upper ends thereof and connected to the outer coils thereof, a pad of sponge rubber positioned over the ends of said springs, projections formed on said pad within said tie wire and defining pockets within which the ends of said springs are received, and a tie strip secured to the edges of said pad and to said frame for retaining said pad on said springs, said projections being cut away where said tie wire and outer coils are connected, said projections being undercut so as to clamp around the ends of said springs.

3. A cushion comprising a frame, a series of coil springs supported on said frame with their axes normal to the plane of said frame, a pad of sponge rubber positioned against the opposite ends of said coil springs, projections formed on the surface of said pad defining pockets arranged to receive the ends of said springs, means connected to the upper ends of said springs and tying the ends of said springs together, said projections defining troughs to receive said last mentioned means, and a tie strip secured around the edges of said pad and to said frame.

4. A cushion comprising a frame, a series of coil springs supported on said frame with their axes normal to the plane of said frame, a pad of sponge rubber positioned against the opposite ends of said coil springs, projections formed on the surface of said pad defining pockets arranged to receive the ends of said springs, means connected to the upper ends of said springs and tying said springs together, said projections defining troughs to receive said last mentioned means, and a tie strip secured around the edges of said pad and to said frame, said pockets and troughs being tapered so as to clamp around said springs and said tie means.

5. A cushion comprising a frame, a series of coil springs supported on said frame with their axes normal to the plane of said frame, a pad of sponge rubber positioned against the opposite ends of said coil springs, projections formed on the surface of said pad defining pockets arranged to receive the ends of said springs, tie springs connecting the ends of said coil springs, said projections defining troughs arranged to receive said tie springs, and a tie strip secured around the edge of said pad and fastened to said frame.

6. A cushion comprising a frame, a series of coil springs supported on said frame with their axes normal to the plane of said frame, a pad of sponge rubber positioned against the opposite ends of said coil springs, projections formed on the surface of said pad defining pockets arranged to receive the ends of said springs, tie springs connecting the ends of said coil springs, said projections defining troughs arranged to receive said tie springs, and a tie strip secured around the edge of said pad and fastened to said frame, said projections being undercut so as to grip the ends of said coil springs and said tie springs.

7. In a cushion, a generally rectangular frame, a series of coil springs having their lower ends secured to said frame, a boundary wire surrounding the upper ends of said coil springs and secured to the outer coils of said series, tie springs joining the upper ends of said coil springs, a diagonal tie wire connected between said frame and said boundary wire, a pad of sponge rubber having projections formed on the under side thereof and arranged to fit around the upper ends of said coil springs, along the sides of said tie springs and within said boundary wire, and a tie strip secured to the edges of said pad and fastened to said frame.

8. In a seat cushion, a pad of sponge rubber having projections with arcuate side walls formed on one surface of said pad, said side walls defining a series of circular pockets on the surface of said pad and aligned in two directions, said projections having other side walls defining troughs on the surface of said pad connecting diagonally positioned pockets, the outside pockets intersecting the edge of said projections.

9. In a seat cushion, a pad of sponge rubber having projections with arcuate side walls formed on one surface thereof, said side walls defining a series of circular pockets on the surface of said pad and aligned in two directions, said projections having other side walls defining troughs connecting diagonally positioned pockets, the outside pockets of said series of pockets intersecting the outer edge of said projections, said projections being undercut so that said pockets and troughs are wider adjacent to the body of said pad.

10. In a seat cushion, a pad of sponge rubber having projections with side walls formed on one surface thereof, said side walls defining a series of pockets on the surface of said pad and aligned in two directions, said projections having other side walls defining troughs connecting diagonally positioned pockets, the outside pockets of said series of pockets intersecting the outer edge of said projections, said projections being undercut so that said pockets and troughs are wider adjacent to the body of said pad, and a boundary portion of tapered thickness formed on said pad outside of said projections.

11. In a seat, a pad of sponge rubber having projections formed on the under side thereof defining a series of depressions and grooves connecting said depressions, and a spring assembly braced against lateral deflection and having an upper surface arranged to fit within said depressions and grooves in said pad, said depressions being undercut so as to grip the upper surface of said spring assembly.

HENRY C. BORISCH.